United States Patent [19]

Murakami et al.

[11] Patent Number: 4,774,297

[45] Date of Patent: Sep. 27, 1988

[54] SILICONE PRESSURE-SENSITIVE ADHESIVE COMPOSITION

[75] Inventors: Ichiro Murakami; Yuji Hamada; Osamu Takuman, all of Chiba, Japan

[73] Assignee: Toray Silicone, Co., Ltd., Tokyo, Japan

[21] Appl. No.: 56,932

[22] Filed: Jun. 3, 1987

[30] Foreign Application Priority Data

Jul. 15, 1986 [JP] Japan .............................. 61-166352

[51] Int. Cl.⁴ .......................................... C08F 283/00
[52] U.S. Cl. ..................................... 525/478; 528/15; 528/31; 528/32
[58] Field of Search ............................ 528/15, 31, 32; 525/478

[56] References Cited

U.S. PATENT DOCUMENTS 3,983,298  4/1975  Hahn et al. ......................... 528/15
4,500,584  2/1985  Modic ................................. 528/15

*Primary Examiner*—Melvyn I. Marquis
*Attorney, Agent, or Firm*—George A. Grindahl

[57] ABSTRACT

A pressure-sensitive adhesive having an excellent tack and adhesive strength is obtained from a composition which comprises an organic solvent solution of an alkenyl group-containing silicone polymer having a gum-like consistency, a tackifying silicone resin, a curing agent for the alkenyl group-containing silicone polymer and a platinum-containing catalyst. The composition can be cured by heating at relatively low temperatures.

10 Claims, No Drawings

SILICONE PRESSURE-SENSITIVE ADHESIVE COMPOSITION

BACKGROUND OF THE INVENTION

The present invention relates to an addition-reacting silicone pressure-sensitive adhesive composition which can be cured to give a pressure-sensitive adhesive.

Silicone pressure-sensitive adhesives have an excellent adhesive strength, tack, and cohesive strength, which are the properties required of a pressure-sensitive adhesive. In addition, they also have the heat resistance, cold resistance, and electrical properties, etc., characteristic of silicones, and so are widely used for e,lectric-insulating tape, which must be highly reliable, and for various pressure-sensitive products which must be resistant to hot and cold.

In general, organoperoxide-curing compositions are used as silicone pressure-sensitive adhesive compositions. A composition which cures by the addition reaction between alkenyl-containing organopolysiloxane and organopolysiloxane having silicon-bonded hydrogen atoms has also been disclosed in Japanese Patent Publication No. 54-37907 [37,907/79].

However, said organoperoxide-curing compositions must be cured by heating at temperatures of at least 130° C. in order to convert them into the pressure-sensitive adhesive. As a consequence, they cannot be used with poorly heat-tolerant substrates.

At the same time, the aforementioned addition-curing composition suffers from variations in its adhesive strength due to the difficulty of forming a film with good physical properties on the substrate.

BRIEF SUMMARY OF THE INVENTION

The inventors carried out an investigation in order to eliminate the above-noted problems residing in the prior art, and the present invention was developed as a consequence.

The object of the present invention is to provide a pressure-sensitive adhesive composition which can be cured at relatively low temperatures into a pressure-sensitive adhesive having an excellent tack and adhesive strength.

This object, and others that will become apparent upon consideration of the following disclosure and appended claims, are obtained by the compositions of this invention which, briefly stated, comprise an organic solvent solution of an alkenyl group-containing silicone polymer having a gum-like consistency, a tackifying silicone resin, a curing agent for the alkenyl group-containing silicone polymer and a platinum-containing catalyst.

DETAILED DESCRIPTION OF THE INVENTION

The present invention relates to a silicone pressure-sensitive adhesive composition comprising (A) 30 to 70 parts by weight of a polydiorganosiloxane having the general formula $R'R_2SiO(R_2SiO)_nSiR_2R'$ wherein R denotes a monovalent hydrocarbon group. R' denotes an alkenyl group, and n is an integer having an average value sufficient to provide a viscosity of at least 500,000 centipoise at 25° C. for the polydiorganosiloxane, (B) 70 to 30 parts by weight of an organopolysiloxane constituted of $R''_3SiO_{\frac{1}{2}}$ units and $SiO_2$ units in a molar ratio of the former units to the latter units of from 0.6:1 to 0.9:1, wherein R'' denotes a group selected from among alkyl groups, alkenyl groups, and the hydroxyl group, at least 95 percent of all R'' groups being the methyl group, (C) an amount of an organohydrogenpolysiloxane having an average of at least 2 silicon-bonded hydrogen atoms in each molecule, said amount being sufficient to provide from 1 to 20 silicon-bonded hydrogen atoms per alkenyl group in Component (A), (D) a platinum-containing catalyst for the addition reaction of silicon-bonded alkenyl groups with silicon-bonded hydrogen atoms, in an amount sufficient to provide from 0.1 to 1000 parts by weight of platinum for every one million parts by weight of the combined quantity of Components (A) through (C). and (E) from 25 to 400 parts by weight of an organic solvent for Components (A) through (C).

To explain the preceding, Component (A) is the principal curable component of the pressure-sensitive adhesive composition of the present invention, and curing thereof proceeds by an addition reaction with Component (C) under the catalytic activity of Component (D).

Said Component (A) must have an alkenyl group, which is essential to the addition reaction, at both of its molecular terminals. That is to say, each R' in the above formula for Component (A) must be an alkenyl group, such as vinyl, allyl or propenyl. The vinyl group is a preferred terminal alkenyl group.

R in the above formula for Component (A) is to be any monovalent hydrocarbon group such as, for example, alkyl groups such as methyl, ethyl, and propyl; alkenyl groups such as vinyl, allyl, and propenyl; and aryl groups such as phenyl. Methyl is, in general, a preferred R group. When R is alkenyl vinyl is a preferred alkenyl group. When greater heat resistance is required, the phenyl group and methyl group will be present together, optionally in up to equal amounts.

It is essential that the molecular weight of Component (A), and therefore the value of n, correspond to a viscosity of at least 500,000 cP (centipoise) and preferably at least 1,000,000 cP, when measured at 25° C. For example, when all R groups are methyl, or optionally up to about 5% vinyl and the remainder methyl, the average value of n will range upwards from about 1500, and preferably upwards from about 1800. For other R groups the corresponding value of n will depend upon the particular R groups that are present in the polydiorganosiloxane. In general the so-called silicone gums are preferred here, where the value of n can be as large as 5000 and more.

Alkenyl-terminated polydiorganosiloxanes are well known in the organosilicone art and their syntheses need no further delineation herein. Typically, an alkenyl-containing terminating reactant, such as divinyltetramethyldisiloxane, is equilibrated with a diorganosiloxane reactant, such as octamethylcyclotetrasiloxane, in the presence of an acidic or alkaline catalyst. A phenyl group-containing and/or a vinyl group-containing diorganosiloxane reactant can also be included in the reaction mixture to introduce phenyl and/or vinyl groups into the polymer chain, if desired. Additionally, phenyl groups can be incorporated into the alkenyl group-containing terminating reactant, if desired. The molecular weight of the polydiorganosiloxane can be controlled by use of the appropriate amount of terminating reactant, in the well-known manner.

Component (B) in the compositions of this invention is an organopolysiloxane which imparts tack to the cured pressure-sensitive adhesive. In the above formula for the siloxane units of Component (B) R" is a monovalent group selected from among alkyl groups such as methyl, ethyl, and propyl; alkenyl groups such as vinyl and allyl; and the hydroxyl group; with the proviso that at least 95 mol % of all groups R" is to be methyl. Preferably all of the R" groups are methyl. Component (B) typically contains residual silanol groups which arise from the hydrolysis of reactive silanes that are used to prepare Component (B).

The molar ratio of R"$_3$SiO$_{\frac{1}{2}}$ units to SiO$_2$ units in Component (B) preferably falls within the range of 0.6:1 to 0.9:1. The tackiness of the pressure-sensitive adhesive is reduced at below 0.6 R"$_3$SiO$_{\frac{1}{2}}$ unit per SiO$_2$ unit, while the cohesive strength is reduced at a ratio above 0.9:1.

Methods for synthesizing such organopolysiloxanes are known. The disclosures of U.S. Pat. Nos. 2,676,182 and 3,284,406 are incorporated herein by reference to show the preparation of organopolysiloxanes which are suitable as Component (B) in the compositions of this invention.

Component (C) in the compositions of this invention is the component which functions as the crosslinker curing agent for Component (A). Curing proceeds by the addition reaction of the silicon-bonded hydrogen atoms in this component with the alkenyl groups in Component (A) under the catalytic activity of Component (D).

Component (C) can be any of the currently known organohydrogenpolysiloxanes having an average of at least two, and preferably three or more, silicon-bonded hydrogen atoms in each molecule. The molecular structure of this component is not critical and can be cyclic, linear, branched and/or network, as desired. The organic groups in Component (C) can be any monovalent hydrocarbon group free of aliphatic unsaturation, as is well known, such as the general and specific alkyl and aryl groups denoted above for Component (A). For maximum compatibility of Components (A), (B) and (C) the organic groups in each component are preferably the same.

In a preferred embodiment of this invention Component (C) is a linear methylhydrogenpolysiloxane comprised of methylhydrogensiloxane units and, optionally, dimethylsiloxane units. The terminal siloxane units of this linear siloxane are not critical and can be triorganosiloxane units or diorganohydrogensiloxane units or mixtures thereof, wherein the organic groups are, for example, methyl.

The quantity of Component (C) is sufficient to provide from 1 to 20 silicon-bonded hydrogen atoms per alkenyl group in Component (A).

Component (D) is a platinum-containing catalyst, and it promotes the addition reaction of Component (A) with Component (C). Concrete examples here are chloroplatinic acid, chloroplatinic acid-olefin complexes, chloroplatinic acid-vinylsiloxane complexes, and platinum supported on a microparticulate carrier such as alumina.

Component (D) is added in a quantity sufficient to give from 0.1 to 1000, and preferably 1 to 300, parts by weight of platinum for every one million parts by weight of the combined quantity of Components (A) through (C). The crosslinking reaction will be unsatisfactory at below 0.1 part, and the cohesive strength will thus be reduced, while exceeding 1,000 parts is disadvantageous due to the resulting short use time and high cost.

Component (E) functions to dissolve Components (A) through (D) so the pressure-sensitive adhesive composition of the present invention may be easily applied to various substrates. Concrete examples of this component are hydrocarbon solvents, such as toluene, xylene and mineral spirits; and halogenated hydrocarbon solvents, but no specific restriction is placed on this component as long as it is an organic solvent which can dissolve Components (A) through (C) and which does not inhibit the aforementioned addition reaction.

In addition to Components (A) through (E), any of the addition-reaction inhibitors known in the art may be added to the compositions of the present invention. Concrete examples thereof are the ene-ynes, such as 3-methyl-3-pentene-1-yne and 3,5-dimethyl-3-hexene-1-yne; the alkynyl alcohols, such as 3-methyl-1-butyne-3-ol, 3,5-dimethyl-1-hexyne-3-ol, 3-methyl-1-pentyne-3-ol, and phenylbutynol; the unsaturated ester, such as alkyl and substituted alkyl maleates; and polymethylvinylcyclosiloxanes.

Furthermore, the addition of small quantities of supplementary components to the composition of the present invention is permissible. Such supplementary components are, for example, the various antioxidants, pigments, stabilizers, fillers, etc.

With regard to the substrate in pressure-sensitive adhesive products which may be obtained using the pressure-sensitive adhesive composition of the present invention, various materials are operative here, for example, plastic films such as films of polyester, polytetrafluoroethylene or polyimide; paper such as Japanese paper and synthetic paper; textiles; glass wool; and metal foils.

The present invention will be further explained, but not limited, by the following illustrative examples. In the examples, part=parts by weight, and %=wt %. Viscosities were measured at 25° C. The properties reported in the examples were measured by the following methods.

Measurement of Adhesive Strength

The silicone pressure-sensitive adhesive composition was coated in the specified thickness on the substrate, followed by curing by heating. The resulting pressure-sensitive tape was pressed, using a 2 kg rubber roller, onto stainless steel plate (SUS304) whose surface had been polished in advance with #280 water-resistant polishing paper. After standing for 1 hour at room temperature, the sample was peeled using a tensile tester (Tensilon from Toyo-Baldwin Kabushiki Kaisha) at a rate of 0.3 m/minute in order to measure the adhesive strength, which is expressed in units of g/2.5 cm.

Measurement of Cohesive Strength

Pressure-sensitive tape produced as in the aforementioned measurement of adhesive strength was pressed over a surface area corresponding to a length of 20 mm and a width of 10 mm, using a 2 kg rubber roller, onto stainless steel plate (SUS304) whose surface had been polished in advance with #280 water-resistant polishing paper. A 500 g load was applied to the lower end of the pressure-sensitive tape, and this was suspended in an oven at 100° C. for 2 hours. The slippage was measured using a viewing microscope, and is expressed in mm.

Measurement of the Ball Tack

Pressure-sensitive tape produced as in the measurement of adhesive strength was placed with the tack surface up on a ball tack tester (Tester Sangyo Kabushiki Kaisha) inclined at an angle of 30°. Steel balls of various sizes were rolled down from a 10 cm long runway. The reported value is the diameter, in units of 1/32 inch, of the largest steel ball which came to a halt on a tack surface 10 cm in length. For example, a reported value of 10 means that a steel ball with a diameter of 10/32 inch was the largest steel ball coming to rest on the tack surface. This measurement was conducted at room temperature.

EXAMPLE 1

Exactly 55 parts methylpolysiloxane composed of $Me_3SiO_{\frac{1}{2}}$ units and $SiO_2$ units in a 0.7:1.0 molar ratio, 45 parts dimethylvinylsiloxy-terminated polydimethylsiloxane gum having a vinyl group content of 0.02%, 0.2 part trimethylsiloxy-terminated methylhydrogenpolysiloxane having a viscosity of 20 cP, and 0.2 part 3-methyl-1-butyne-3-ol reaction inhibitor were dissolved in 150 parts toluene. A pressure-sensitive adhesive composition (40% nonvolatiles) was obtained by adding chloroplatinic acid-vinylsiloxane complex to this mixture in an amount sufficient to give 100 ppm platinum based on the combined quantity of the above polysiloxanes.

This composition was coated on a 50 micron-thick aluminum foil and heated at 80° C. for 5 minutes to give a 50 micron-thick film after heating. The film-forming performance, adhesive strength, ball tack, and cohesive strength of the obtained aluminum foil-backed pressure-sensitive tape were measured, and these results are reported in Table 1.

For comparison, a pressure-sensitive adhesive composition (nonvolatiles=40%) was produced as above, but using a dimethylvinylsiloxy-terminated dimethylpolysiloxane with a viscosity of 60,000 cP in place of the dimethylvinylsiloxy-terminated dimethylpolysiloxane gum. This composition was evaluated by the same methods as above, and these results are also reported in Table 1.

According to Table 1, the pressure-sensitive adhesive composition of this invention provided an excellent adhesive strength, ball tack, and cohesive strength, all of which are essential properties for a pressure-sensitive adhesive. On the other hand, the pressure-sensitive adhesive composition which used the 60,000 cP dimethylvinylsiloxy-terminated dimethylpolysiloxane gave low values for the adhesive strength, ball tack, and cohesive strength.

TABLE 1

| Measurement | Example 1 | Comparison |
|---|---|---|
| Adhesive Strength. g/2.5 cm | 3,800 | 2,000 |
| Ball Tack | 29 | 17 |
| Cohesive Strength, mm | 0 | 2.0 |

EXAMPLE 2

Exactly 55 parts methylpolysiloxane composed of $Me_3SiO_{\frac{1}{2}}$ units and $SiO_2$ units in a 0.7:1.0 molar ratio, 45 parts dimethylvinylsiloxy-terminated dimethylsiloxane-co-methylphenylsiloxane copolymer gum having a vinyl group content of 0.02% and a phenyl group content of 3.0%, 0.4 part trimethylsiloxy-terminated dimethylsiloxane-co-methylhydrogensiloxane copolymer having a viscosity of 6 cP (silicon-bonded hydrogen atom:methyl group molar ratio=1:3), and 0.2 part phenylbutynol addition-reaction inhibitor were dissolved in 150 parts toluene. A pressure-sensitive adhesive composition having 40% nonvolatiles was obtained by adding chloroplatinic acid-vinylsiloxane complex to this mixture in an amount sufficient to give 180 ppm platinum based on the combined quantity of the polysiloxanes. This composition was evaluated as described in Example 1, and these results were: Adhesive Strength=3,800 g/2.5 cm; Ball Tack=29; Cohesive Strength=0.3 mm.

According to these data this pressure-sensitive adhesive composition performed well as a silicone pressure-sensitive adhesive even at the relatively low crosslinking temperature of 80° C.

EXAMPLE 3

Exactly 57 parts methylpolysiloxane composed of $Me_3SiO_{\frac{1}{2}}$ units and $SiO_2$ units in a 0.7:1.0 molar ratio, 43 parts dimethylvinylsiloxy-terminated dimethylsiloxane-co-methylvinylsiloxane copolymer gum having a vinyl group content of 0.05%, 0.2 part trimethylsiloxy-terminated methylhydrogenpolysiloxane having a viscosity of 20 cP, and 0.2 part 3-methyl-3-pentene-1-yne reaction inhibitor were dissolved in 150 parts toluene. A pressure-sensitive adhesive composition (40% nonvolatiles) was obtained by adding chloroplatinic acid-vinylsiloxane complex to this mixture in an amount sufficient to give 110 ppm platinum based on the polysiloxane fraction. This composition was evaluated as described in Example 1, and the results were an Adhesive Strength=3,700 g/2.5 cm; Ball Tack=25; Cohesive Strength=0.1 mm.

EXAMPLE 4

Exactly 57 parts methylpolysiloxane composed of $Me_3SiO_{\frac{1}{2}}$ units and $SiO_2$ units in a 0.7:1.0 molar ratio, 43 parts dimethylvinylsiloxy-terminated dimethylpolysiloxane having a vinyl group content of 0.07% and a viscosity of 600,000 cP, 0.4 part trimethylsiloxy-terminated dimethylsiloxane-co-methylhydrogensiloxane copolymer having a viscosity of 6 cP (silicon-bonded hydrogen atom:methyl group molar ratio=1:3), and 0.2 part phenylbutynol addition-reaction inhibitor were dissolved in 25 parts toluene. A pressure-sensitive adhesive composition (80% nonvolatiles) was obtained by adding chloroplatinic acid-vinylsiloxane complex to this mixture in an amount sufficient to give 110 ppm platinum based on the polysiloxane fraction. This composition was evaluated as described in Example 1, and the results were an adhesive strength of 4,200 g/2.5 cm, a ball tack of 27, and a cohesive strength of 0.3 mm.

COMPARISON EXAMPLE 1

Exactly 150 parts toluene are added to 55 parts methylpolysiloxane composed of $Me_3SiO_{\frac{1}{2}}$ units and $SiO_2$ units in a 0.7:1.0 molar ratio and 45 parts hydroxyl-terminated polydimethylsiloxane gum. This was heated at 110° C. for 6 hours, and 1 part benzoyl peroxide, diluted in a small quantity of xylene. was mixed in with vigorous stirring to afford a silicone pressure-sensitive adhesive composition. This was coated, heated and evaluated as described in Example 1, and the results were Film Thickness=48 microns; Adhesive Strength=4,000 g/2.5 cm; Ball Tack=30; Cohesive Strength not measurable because the tape slipped from the stainless steel plate.

EFFECTS OF THE INVENTION

Because the silicone pressure-sensitive adhesive composition of the present invention is an addition-reacting silicone pressure-sensitive adhesive composition in which components (B) through (E) are blended into a polydiorganosiloxane having alkenyl groups at both molecular terminals and having a viscosity of at least 500,000 cP, it characteristically can be cured at relatively low temperatures, and is converted into a pressure-sensitive adhesive having an excellent tack and adhesive strength.

That which is claimed is:

1. A silicone pressure-sensitive adhesive composition comprising
   (A) 30 to 70 parts by weight of a polydiorganosiloxane having the general formula $$R'R_2SiO(R_2SiO)_nSiR_2R'$$

wherein R denotes a monovalent hydrocarbon group, R' denotes an alkenyl group, and n is an integer having an average value sufficient to provide a viscosity of at least 500,000 centipoise at 25° C. for the polydiorganosiloxane,
   (B) 70 to 30 parts by weight of an organopolysiloxane constituted of $R''_3SiO_{\frac{1}{2}}$ units and $SiO_2$ units in a molar ratio of the former units to the latter units of from 0.6:1 to 0.9:1, wherein R'' denotes a group selected from the group consisting of methyl and the hydroxyl group, at least 95 percent of all R'' groups being the methyl group,
   (C) an amount of an organohydrogenpolysiloxane having an average of at least 2 silicon-bonded hydrogen atoms in each molecule, said amount being sufficient to provide from 1 to 20 silicon-bonded hydrogen atoms per alkenyl group in component (A),
   (D) a platinum-containing catalyst for the addition reaction of silicon-bonded alkenyl groups with silicon-bonded hydrogen atoms, in an amount sufficient to provide from 0.1 to 1000 parts by weight of platinum for every one million parts by weight of the combined quantity of components (A) through (C), and
   (E) from 25 to 400 parts by weight of an organic solvent for Components (A) through (C).

2. A composition in accordance with claim 1 wherein R' denotes the vinyl group.

3. A composition in accordance with claim 2 wherein R is selected from the group consisting of methyl, phenyl and vinyl and R'' denotes the methyl group.

4. A composition in accordance with claim 3 wherein the organohydrogenpolysiloxane consists essentially of trimethylsiloxane units, methylhydrogensiloxane units and, optionally, dimethylsiloxane units.

5. A composition in accordance with claim 4 wherein the polydiorganosiloxane has the formula $$ViMe_2SiO(Me_2SiO)_nSiMe_2Vi$$

wherein Me denotes the methyl group and Vi denotes the vinyl group.

6. A composition in accordance with claim 5 wherein the organohydrogenpolysiloxane has the formula $$Me_3SiO(MeHSiO)_a(Me_2SiO)_bSiMe_3$$

wherein a has an average value of at least 3 and b has an average value of 0 or more.

7. A composition in accordance with claim 4 wherein the polydiorganosiloxane has the formula $$ViMe_2SiO(Me_2SiO)_{n-c}(MePhSiO)_cSiMe_2Vi$$

wherein Me denotes the methyl group, Vi denotes the vinyl group, Ph denotes the phenyl group and c has a value of from 1 to n.

8. A composition in accordance with claim 7 wherein the organohydrogenpolysiloxane has the formula $$Me_3SiO(MeHSiO)_a(Me_2SiO)_bSiMe_3$$

wherein a has an average value of at least 3 and b has an average value of 0 or more.

9. A composition in accordance with claim 4 wherein the polydiorganosiloxane has the formula $$ViMe_2SiO(Me_2SiO)_{n-d}(MeViSiO)_dSiMe_2Vi$$

wherein Me denotes the methyl group, Vi denotes the vinyl group, and d has a value of from 1 to 0.1 n.

10. A composition in accordance with claim 9 wherein the organohydrogenpolysiloxane has the formula $$Me_3SiO(MeHSiO)_a(Me_2SiO)_bSiMe_3$$

wherein a has an average value of at least 3 and b has an average value of 0 or more.

* * * * *